United States Patent
Pettitt et al.

(10) Patent No.: US 7,893,572 B2
(45) Date of Patent: Feb. 22, 2011

(54) MOTOR ATTACHMENT ASSEMBLY FOR PLASTIC POST ISOLATION SYSTEM

(75) Inventors: Edward Douglas Pettitt, Burt, NY (US); Kari Ann Sausen, Clarence, NY (US); John Patrick Morgan, Lancaster, NY (US)

(73) Assignee: Delphi Technologies, Inc., Troy, MI (US)

( * ) Notice: Subject to any disclaimer, the term of this patent is extended or adjusted under 35 U.S.C. 154(b) by 268 days.

(21) Appl. No.: 12/229,616

(22) Filed: Aug. 25, 2008

(65) Prior Publication Data

US 2009/0058203 A1     Mar. 5, 2009

Related U.S. Application Data

(60) Provisional application No. 60/966,458, filed on Aug. 28, 2007.

(51) Int. Cl.
*H02K 5/24* (2006.01)

(52) U.S. Cl. .............. 310/51; 310/91; 310/89; 248/346.04

(58) Field of Classification Search ............ 310/51, 310/91, 89; 248/313–314, 346.04
See application file for complete search history.

(56) References Cited

U.S. PATENT DOCUMENTS

| | | | | |
|---|---|---|---|---|
| 1,647,069 A | * | 10/1927 | Ahlman ................... 248/313 |
| 3,310,270 A | * | 3/1967 | Ciancio .................... 248/210 |
| 3,815,311 A | * | 6/1974 | Nisula et al. ............... 52/579 |
| 3,941,339 A | * | 3/1976 | McCarty ................... 248/603 |
| 4,161,667 A | * | 7/1979 | Buckman et al. ............ 310/51 |
| 4,384,224 A | * | 5/1983 | Spitler et al. ............... 310/81 |
| 4,676,473 A | * | 6/1987 | Giles ....................... 248/638 |
| 5,126,607 A | * | 6/1992 | Merriman, Jr. ............. 310/51 |
| 5,165,871 A | * | 11/1992 | Iwabuchi ................... 417/417 |
| 5,521,447 A | * | 5/1996 | Bertolini et al. ............ 310/51 |
| 5,533,704 A | | 7/1996 | Fischinger et al. |
| 5,604,645 A | * | 2/1997 | Weaver ..................... 359/877 |
| 5,786,647 A | * | 7/1998 | Vollmer et al. ............. 310/89 |
| 5,836,773 A | | 11/1998 | McHugh et al. |
| 5,883,449 A | * | 3/1999 | Mehta et al. ............. 310/60 R |
| 6,021,993 A | * | 2/2000 | Kirkwood .................. 248/634 |
| 6,045,112 A | * | 4/2000 | Kirkwood .................. 248/634 |

(Continued)

FOREIGN PATENT DOCUMENTS

JP      06006947 A  *  1/1994

*Primary Examiner*—Quyen Leung
*Assistant Examiner*—Alex W Mok
(74) *Attorney, Agent, or Firm*—Patrick M. Griffin

(57) ABSTRACT

The invention provides for a motor attachment assembly that includes an electric motor having spring clips adapted to securely lock onto the isolation posts of a plastic post vibration isolation system. The motor includes an end cap that has notches which cooperate with locator tabs of the motor housing to lock the cap onto the housing with the spring clips therebetween. Each clip includes an axial slot that is expandable in an open direction to receive an isolation post and biased in the closed direction to retain the isolation post. Each clip also has an inner surface with barbs protruding into the channel to allow insertion of the isolation post into the channel in the direction of the output shaft and to resist movement of the isolation post in a direction opposite to the output shaft. The inner surface has a retention groove to receive plastically deformed portions of the isolation post.

8 Claims, 2 Drawing Sheets

U.S. PATENT DOCUMENTS

| | | | |
|---|---|---|---|
| 6,448,678 B1 * | 9/2002 | Simpson | 310/89 |
| 6,541,883 B2 * | 4/2003 | Uffelman | 310/71 |
| 6,552,464 B1 * | 4/2003 | Rahbar et al. | 310/239 |
| 6,717,299 B2 * | 4/2004 | Bacile et al. | 310/51 |
| 6,858,955 B2 | 2/2005 | Lau | |
| 6,913,233 B2 | 7/2005 | Puett et al. | |
| 6,987,336 B2 * | 1/2006 | Streng et al. | 310/51 |
| 7,036,825 B2 * | 5/2006 | Pettitt et al. | 277/628 |
| 2003/0098622 A1 * | 5/2003 | Lino | 310/89 |
| 2003/0117030 A1 * | 6/2003 | Agnes et al. | 310/89 |
| 2004/0080226 A1 | 4/2004 | Blum | |
| 2004/0255878 A1 * | 12/2004 | Stevens et al. | 123/41.49 |
| 2006/0038452 A1 * | 2/2006 | Lesak | 310/90 |
| 2006/0061224 A1 * | 3/2006 | Mullin et al. | 310/91 |
| 2006/0071566 A1 * | 4/2006 | Ha | 310/89 |
| 2006/0261692 A1 * | 11/2006 | Wong et al. | 310/89 |
| 2007/0194643 A1 * | 8/2007 | Jones | 310/89 |

* cited by examiner

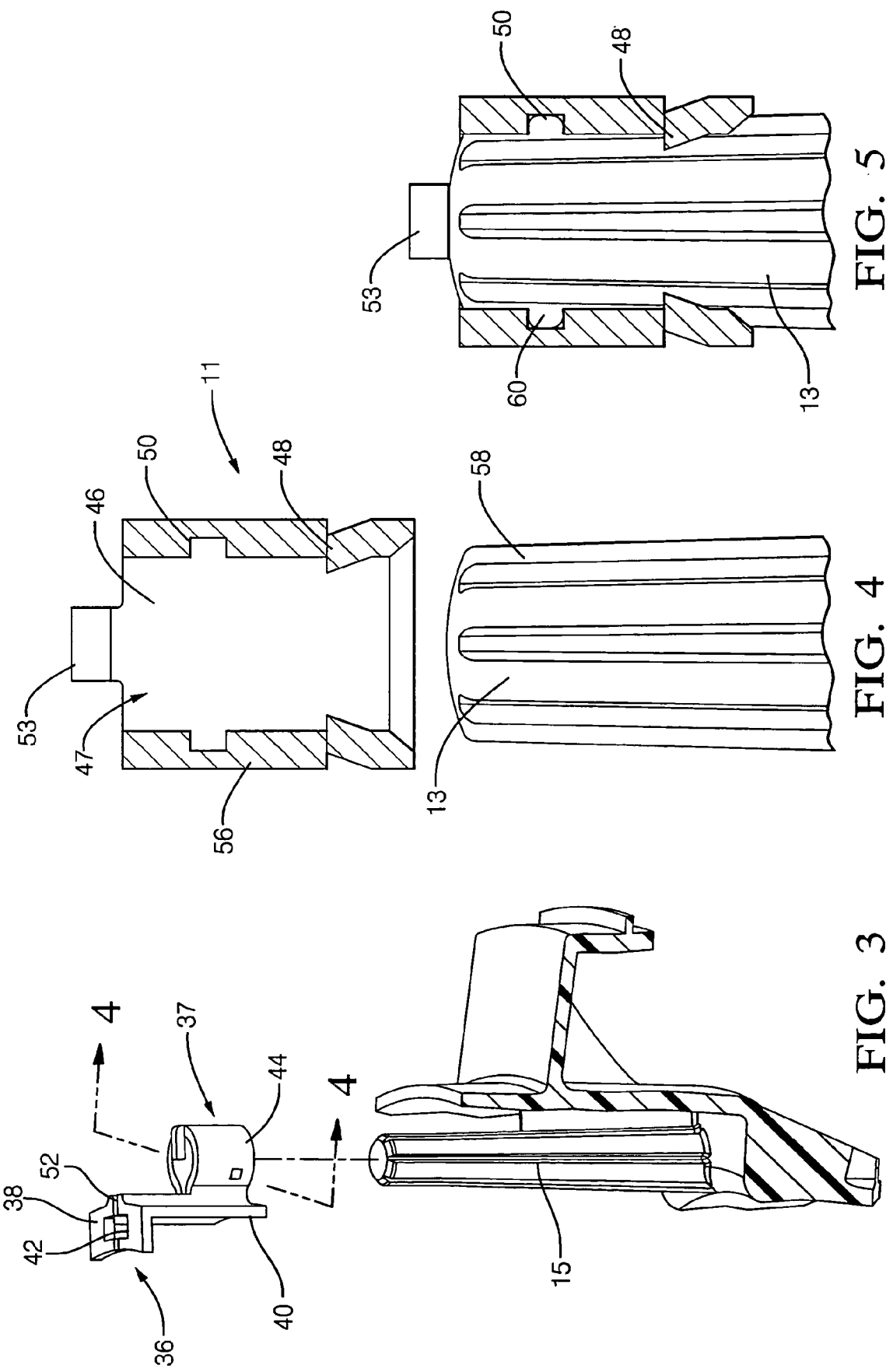

MOTOR ATTACHMENT ASSEMBLY FOR PLASTIC POST ISOLATION SYSTEM

This application claims the benefit of U.S. provisional patent application Ser. No. 60/966,458 for a MOTOR ATTACHMENT FOR PLASTIC ISOLATION, filed on Aug. 28, 2007, which is hereby incorporated by reference in its entirety. This claim is made under 35 U.S.C. §119(e); 37 C.F.R. §1.78; and 65 Fed. Reg. 50093.

TECHNICAL FIELD OF INVENTION

The invention relates to a motor attachment assembly for attaching an electric motor to a motor mount; more specifically, for attaching an electric motor to a motor mount having a plastic post vibration isolation system.

BACKGROUND OF INVENTION

Electric motors, such as that of an electric blower motor mounted onto a heating, ventilating, and air-conditioning (HVAC) module of a vehicle, often produce vibrations in operation. The vibration can be transmitted from the motor through the HVAC module to other components of the HVAC system and eventually to the passenger compartment of a vehicle. To isolate the motor vibrations, the electric motor is typically fastened onto a motor mount assembly that has vibration isolating features, which is in turn mounted to the HVAC module. The motor mount assembly can be a separate component or an integral part of the HVAC module.

General attaching arrangements used to fasten an electric motor to an vibration isolating motor mount assembly and other known electric motor mount assemblies have included the use of axial mounting studs protruding from the motor housing; band type mounts in the form of hoops or ring shaped wire straps that encircle the frame of the motor and attach to the motor mount by mounting arms; and bases that cradle the motors, where the bases have mount points to attach to the motor mount assembly.

U.S. patent application Ser. No. 11/542,542, assigned to Delphi Technologies Inc. on Oct. 3, 2006, discloses an electric blower motor mount assembly for a HVAC module having specially designed plastic isolation posts for isolating vibrations from the motor. The plastic isolation posts extend axially relative to the motor housing. One end of the post is attached to a support structure extending from the motor housing and the other end may be integrally molded with the HVAC module. The isolation posts are designed to provide a desired torsional stiffness to target the natural frequency of the motor and mount system such that isolation/attenuation occurs in the commutation order frequency range. In addition, the posts are designed to provide adequate radial stiffness such that the radial resonant frequency is not shifted in the $1^{st}$ order range (e.g. 16-67 Hz).

The use of known attaching arrangements to attach an electric motor to a motor mount assembly requires an inventory of fasteners and increases the complexity of assembly. Several traditional methods of attachment may be used to attach the motor to the plastic isolation posts as taught by '542; however, there are shortcomings to such traditional methods. Use of screws would require a significant increase in the diameter of the plastic posts and would negatively impact their stiffness as well as adding labor costs and quality problems. Use of push nuts and Tinnerman nuts have similar problems of adding module assembly labor hours, as well as the potential for quality problems associated with dropped fasteners lodging in the motor or module. Snap fits require an undercut in the posts which adds molding complexity. Also, snap fits generally have some "slop" which would allow excessive motor vibration. Attachment methods such as heat staking add capital cost and require extra radial clearance for the tooling to access the plastic nub for melting.

What is needed and desired is a high quality, cost effective, reliable, and compact motor attachment assembly to attach an electric motor to plastic isolation posts without significantly affecting the diameter of the plastic posts, without negatively affecting the designed isolation properties of the plastic posts, and without the potential of dropping fasteners into the final assembly.

SUMMARY OF THE INVENTION

The invention provides for a motor attachment assembly that includes an electric motor having spring clips adapted to securely lock onto the isolation posts of a plastic post vibration isolation system. The motor has an output shaft rotatable about an axis and a housing about the axis. The motor is positioned in an isolator cup that includes a plurality of isolation posts extending axially within the cup's compartment toward the output end of the motor. The motor further includes an end cap having a plurality of notches. The housing of the motor includes a rim that has a plurality of locator tabs extending in the direction of the output shaft. The locator tabs are inserted into the notches and have deformable fingers that are bent to lock the end cap to the housing.

A plurality of spring clips is attached to the motor between the rim of the housing and the end cap. Each of the clips defines an axial channel that receives one of the plastic isolation posts. The clips include a latitudinal segment that defines an aperture to engage the locator tabs. Each of the clips further includes an axial slot that is expandable in an open direction to increase the diameter of the axial channel to receive one of the isolation posts and biased in the closed direction to retain the isolation post by plastically deforming the post. Each clip has an inner surface with barbs protruding into the channel. The barbs are adapted to allow insertion of the isolation post into the channel in the direction of the output shaft and to resist movement of the isolation post in a direction opposite to the output shaft. The inner surface also possesses a plurality of retention grooves to receive the plastically deformed portions of the isolation post.

The invention provides a high quality cost effective reliable motor attachment assembly to attach an electric motor to plastic isolation posts without significantly affecting the diameter of the plastic posts; therefore, would also not negatively impact the designed isolation properties of the plastic posts. The invention also eliminates the potential for dropping fasteners into the final assembly. The invention further reduces the complexity of assembly the motor onto the isolation post because the clips may be assembled with the motor assembly prior to attaching it to the isolation system.

Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which:

FIG. 3 is a perspective view of a plastic post attached to a portion of the isolator cup and a spring clip axially spaced from the plastic up.

FIG. 4 is a side view of the tip portion of a plastic post and a cross sectional view of a spring clip along line 4-4 prior to engagement to the plastic post.

FIG. 5 is a side view of the tip portion of a plastic post and a cross sectional view of a spring clip after engagement to the plastic post.

DETAILED DESCRIPTION OF INVENTION

Figure 2:
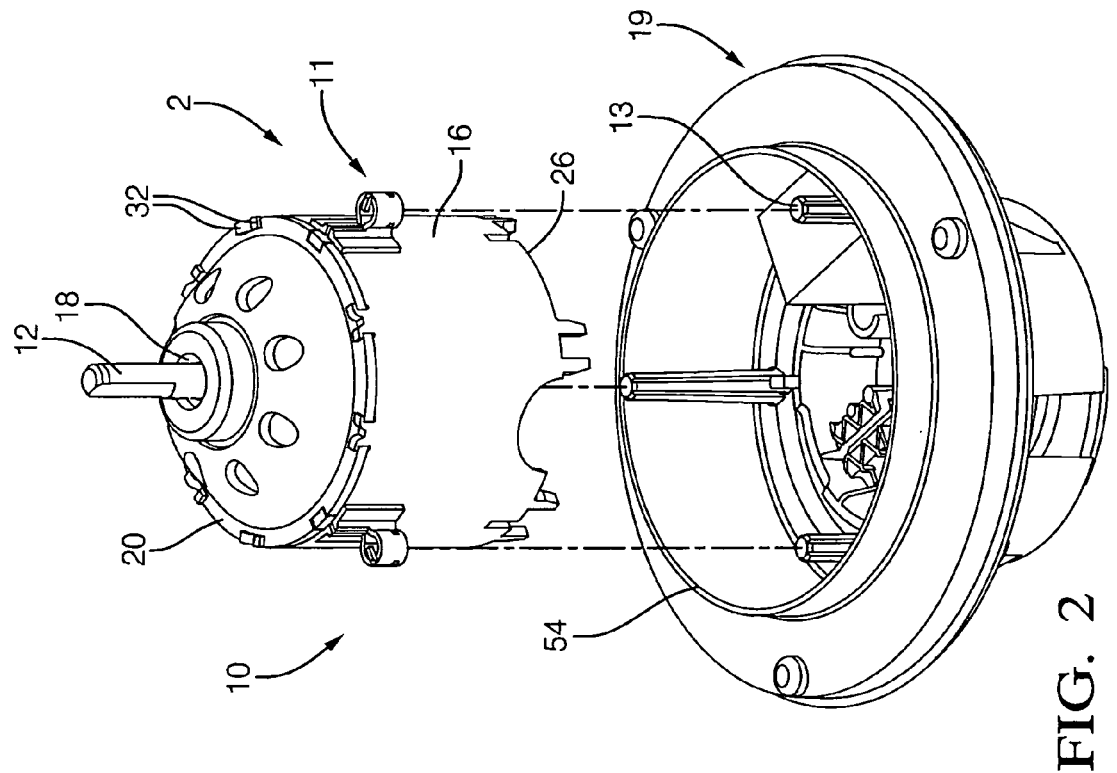
FIG. 2 is an exploded view of an electric motor with spring clips attached axially spaced from a plastic post vibration isolation system.

In accordance with an embodiment of this invention, referring to FIGS. 1-5, similar features are structured similarly, operate similarly, and/or have the same functions unless otherwise indicated by the drawings or this specification. Similar features have been numbered with a common reference numeral. The motor attachment assembly 2 includes an electric motor 10 having spring clips 11 adapted to securely lock onto plastic post 13 of plastic post vibration isolation system 19.

Figure 1:
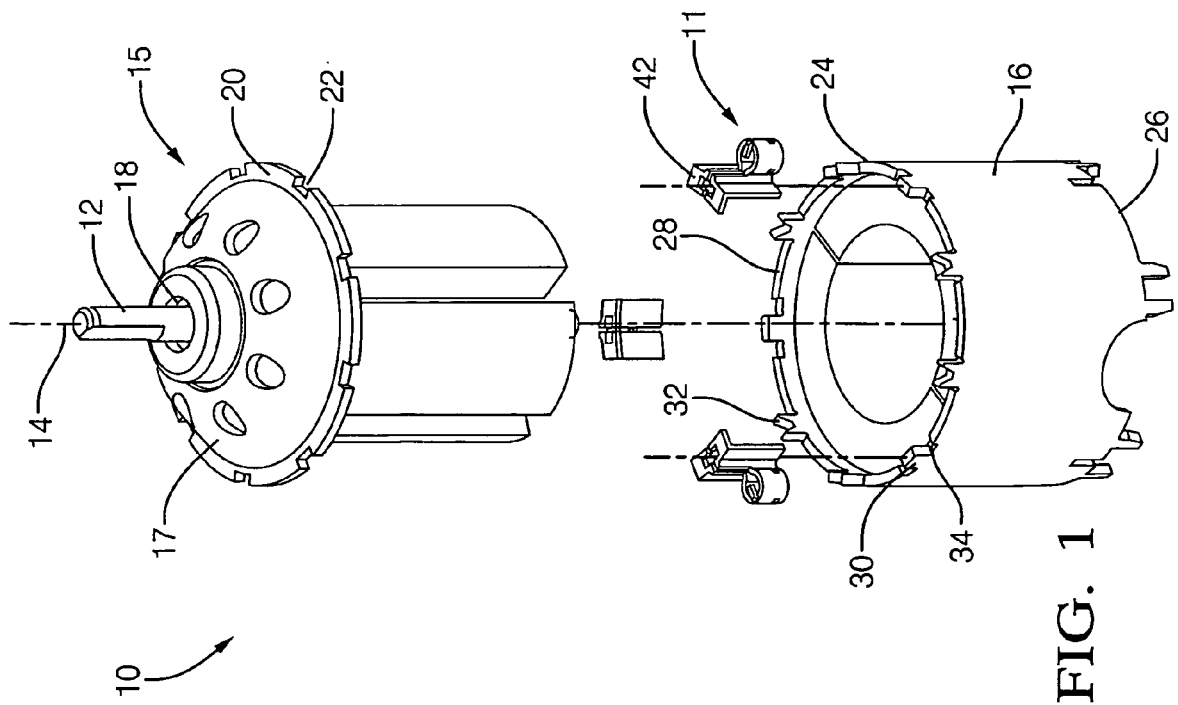
FIG. 1 is an exploded view of an electric motor detached from its housing with spring clips therebetween.

Shown in FIG. 1 is electric motor 10, typical of that of a blower motor for a vehicle HVAC system, having an output shaft 12 arrayed along axis 14 at the output end 15. For illustrative purposes, motor 10 is shown axially spaced apart from housing 16. Adapted to seal the internal workings of motor 10 within housing 16 at output end 15 of motor 10 is end cap 17. End cap 17 includes a port 18 from which output shaft 12 protrudes and ledge 20 circumscribing end cap 17. Ledge 20 extends substantially perpendicularly away from axis 14 and defines a plurality of notches 22 that are substantially symmetrically spaced about axis 14. Ledge 20 has a thickness which is typical of known end caps in the art. A plurality of notches 22 are adapted to be engaged with corresponding features of housing 16, which will be discussed in detail herein below.

Housing 16 has a first end 24 that corresponds with output end of motor 10 and a second end 26 that is opposed to first end 24. First end 24 of housing 16 has a rim 28 that includes a plurality of locator tabs 30 that is less than or equal to the number of notches 22 on ledge 20 of end cap 17. Locator tabs 30 extend axially from rim 28 in the direction of output shaft 12 and are aligned relative to notches 22 defined by ledge 20 of end cap 17. The height of each locator tab 30 is at least equal to the thickness of ledge 20. Cut out of at least one or more locator tabs 30 are deformable fingers 32 that may be spread apart. Once locator tabs 30 are inserted into corresponding notches 22, fingers 32 are spread apart and over ledge 20, thereby locking end cap 17 onto housing 16 as shown in FIG. 2. Located on either side of locator tabs 30 are indentations 34, best shown in FIG. 1, the significance of which will be further discussed herein below.

Positioned between rim 28 and ledge 20 are spring clips 11, which are best shown in FIGS. 1 and 3. Spring clip 11 includes a motor mounting portion 36 that has a latitudinal segment 38 that is perpendicular to axis 14 and a longitudinal segment 40 that is parallel to axis 14 and housing 16. Latitudinal segment 38 defines an aperture 42 adapted to be slipped over locator tab 30 of housing 16 while a portion of the remaining segment is seated into indentations 34 as shown in FIGS. 1 and 2.

Best shown in FIGS. 3 and 4, longitudinal segment 40 includes plastic post mounting portion 37 that includes axial cylinder 44 that defines channel 47 having an initial internal diameter adapted to receive a larger diameter plastic post 13. Shown in FIGS. 4 and 5, axial cylinder 44 has an interior wall 46 that defines channel 47 to receive and securely lock onto plastic post 13. Interior wall 46 includes barb 48 and an annular groove 50 to prevent the extraction of plastic post 13 once the post is inserted into spring. Axial cylinder 44 also includes stop 53 to limit the insertion of plastic post 13 to ensure the proper positioning of motor 10. Located on latitudinal segment 38 and continuing to longitudinal segment 40 is slit 52. Slit 52 is biased toward a closed position, which in turn will decrease the internal diameter of axial cylinder 44. Longitudinal segment 40 is adapted to be securely abutted against housing 16 to prevent lateral movement of spring clip 11 due to torsional forces while the motor is in operation, which is best shown in FIG. 2.

Shown in FIG. 1 is motor attachment assembly 2 having spring clips 11 attached to motor 10 between end cap 17 and housing 16. Motor attachment assembly 2 is shown in FIG. 2 axially spaced apart from plastic post vibration isolation system 19. Vibration isolation system 19 includes motor cup 54 adapted to receive second end 26 of housing 16. Extending axially from motor cup 54 toward output shaft 12 are plastic isolation posts 13. The axial cylinders 44 of spring clips 11 are aligned with plastic post 13 just prior to insertion of plastic post 13 into channel 47 defined by axial cylinder 44.

Shown in FIG. 5, once the plastic post is inserted into channel 47 of spring clip 11, barbs 48 dig into plastic post 13 due to the spring loading of the spring clips and displace the plastic. The plastic initially supports some spring load but begins to flow under stress into annular groove 50. Over time, the plastic creeps into the annular groove 50 due to the radial pressure exerted on to the plastic post from spring clip 11. The plastic material deforms and plastic creeps into the annular groove 50 forming a tongue 60 to further aid in preventing plastic post 13 from being extricated.

A typical plastic post, as shown in FIG. 4 is tapered with an outer diameter of 6.2 mm at the tip and an outer diameter of 8.0 mm at the base. Plastic post 13 includes longitudinal grooves 58 that extend along the length of plastic post 13; however, plastic post 13 may also be smooth or molded with other surface features to enhance the gripping effect of spring clip 11. Spring clip 11 for plastic post 13 as shown has a cylindrical portion 56 with an inner diameter of 5.9 mm which is slighter smaller than the 6.2 mm tip outer diameter of plastic post 13. The cylindrical portion 56 of spring clip 11 has a length of 7.2 mm. The spring clip may be fabricated from Grade 1060 to 1080 steel and austemper heat treated to 48-54 HRC equivalent.

The benefit of the present invention is that it allows for simple press on assembly onto the plastic post once the spring clips are assembled onto the motor. Another benefit of the invention is that it takes advantage of the creep property of plastic to create an interlock.

While this invention has been described in terms of the preferred embodiments thereof, it is not intended to be so limited, but rather only to the extent set forth in the claims that follow.

Having described the invention, it is claimed:

1. A motor attachment assembly comprising:
   a motor having an output end, a shaft rotatable about an axis, and a housing arrayed about said axis, wherein said housing includes a first end portion that corresponds with said output end of said motor, and a second end portion opposed to said first end portion;
   an isolator cup defining an opening and a compartment that receives said second end portion, wherein said isolator cup includes a plurality of isolation posts extending axially within said compartment in the direction of said opening; and a plurality of clips attached to said housing, wherein each of said clips defines an axial channel that receives one of said isolation posts;

wherein each of said clips further comprises an axial slot that is expandable in an open direction to increase the diameter of said axial channel to receive one of said isolation posts and biased in the closed direction to retain said isolation post.

2. The motor attachment assembly of claim 1, wherein each of said clips further comprises an inner surface having a plurality of barbs protruding from said inner surface into said channel, wherein said barbs are adapted to allow insertion of said isolation post into said channel in the direction of said opening and to resist movement of said isolation post in a direction opposite to said opening.

3. The motor attachment assembly of claim 2, wherein said inner surface includes a retention groove circumscribing said inner surface annular, and wherein said isolation post includes a tongue disposed within each of said retention grooves.

4. A motor attachment assembly comprising:
a motor having an output end, a shaft rotatable about an axis, and a housing arrayed about said axis, wherein said housing includes a first end portion that corresponds with said output end of said motor, and a second end portion opposed to said first end portion;
an isolator cup defining an opening and a compartment that receives said second end portion, wherein said isolator cup includes a plurality of isolation posts extending axially within said compartment in the direction of said opening; and
a plurality of clips attached to said housing, wherein each of said clips defines an axial channel that receives one of said isolation posts;
said motor includes an end cap adapted to seal said housing at said first end portion, wherein said end cap includes a plurality of notches spaced about the perimeter edge of end cap;
said housing includes a rim facing said output end, wherein said rim includes a plurality of locator tabs extending in the direction of the output end and engages said notches to locate said end cap; and
each of said clips include a latitudinal segment defining an aperture that engages one of said locator tabs between said rim and said housing.

5. The motor attachment assembly of claim 4, wherein:
said locator tabs include deformable fingers to lock said end cap to said housing with said clips therebetween.

6. A motor attachment assembly comprising:
a motor having an output end, a shaft rotatable about an axis, and a housing about said axis, wherein said housing includes a first end portion that corresponds with said output end, and a second end portion opposed to said first end portion;
an isolator cup defining an opening and a compartment that receives said second end portion, wherein said isolator cup includes a plurality of isolation posts extending axially within said compartment toward direction of said opening;
a plurality of spring clips attached to said housing, wherein each of said spring clips defines an axial channel that receives one of said isolation posts,
an end cap adapted to seal said housing at said first end portion, wherein said end cap includes a plurality of notches spaced about the perimeter edge of end cap;
said housing includes a rim, wherein said rim includes a plurality of locator tabs extending in the direction of the output shaft which engage said notches to locate said end cap; and
said spring clips include a latitudinal segment defining an aperture engaging said locator tabs, wherein said locator tabs include deformable fingers that are bent locking said end cap to said housing with said spring clips therebetween;
wherein each of said spring clips further comprises an axial slot that is expandable in an open direction to increase the diameter of said axial channel to receive one of said isolation posts and biased in the closed direction to retain said isolation post by plastic deformation, an inner surface having barbs protruding into said channel adapted to allow insertion of said isolation post into said channel in the direction of said opening and to resist movement of said isolation post in a direction opposite to said opening, and a groove circumscribing said inner surface to receive a plastically deformed portion of said isolation post.

7. A motor attachment assembly for attaching a motor onto the plastic posts of a plastic post vibration isolation system, comprising:
a motor having a shaft rotatable about an axis and a housing about said axis; and
a spring clip attached to said housing, wherein said spring clip includes an axial cylinder defining a channel having an initial diameter adapted to receive and grip a plastic post having a diameter larger than said initial diameter;
wherein said cylinder includes an axial slot to allow said initial diameter of said channel to flex open to receive said plastic post and a groove formed in an inner surface,
wherein said slot is biased toward said closed position to maintain the initial diameter of said channel, whereby said plastic post is radially compressed and plastically creeps into said grooves forming a tongue to lock said spring clip to said plastic post.

8. A motor attachment assembly for attaching a motor onto the plastic posts of a plastic post vibration isolation system of claim 7, wherein said axial channel includes an inner surface having a plurality of barbs protruding from said inner surface into said channel, wherein said barbs are adapted to allow insertion of said isolation post into said channel in the direction of said opening and to resist movement of said isolation post in a direction opposite to said opening.

* * * * *